(12) United States Patent
Wang et al.

(10) Patent No.: US 11,521,090 B2
(45) Date of Patent: Dec. 6, 2022

(54) COLLABORATIVE DISTRIBUTED MACHINE LEARNING

(71) Applicant: International Business Machines Corporation, Armonk, NY (US)

(72) Inventors: Shiqiang Wang, White Plains, NY (US); Theodoros Salonidis, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1126 days.

(21) Appl. No.: 16/100,177

(22) Filed: Aug. 9, 2018

(65) Prior Publication Data

US 2020/0050951 A1 Feb. 13, 2020

(51) Int. Cl.
*G06N 5/04* (2006.01)
*G06N 20/00* (2019.01)

(52) U.S. Cl.
CPC ............. *G06N 5/043* (2013.01); *G06N 20/00* (2019.01)

(58) Field of Classification Search
CPC ............................... G06N 5/043; G06N 20/00
See application file for complete search history.

(56) References Cited

U.S. PATENT DOCUMENTS

| | | |
|---|---|---|
| 2002/0188562 A1 | 12/2002 | Igarashi et al. |
| 2012/0106362 A1 | 5/2012 | Reumerman et al. |
| 2015/0356488 A1* | 12/2015 | Eden ............... G06Q 10/06395 |
| | | 705/7.41 |
| 2017/0220949 A1 | 8/2017 | Feng et al. |
| 2017/0279831 A1 | 9/2017 | Di Pietro et al. |
| 2017/0279849 A1 | 9/2017 | Weibel et al. |
| 2018/0011643 A1* | 1/2018 | Calder ............... G06F 11/1458 |
| 2019/0102695 A1* | 4/2019 | Biswas ............... G06F 13/102 |
| 2019/0311298 A1* | 10/2019 | Kopp ................. G06K 9/6256 |

(Continued)

OTHER PUBLICATIONS

Qiu ("CrowdSelect: Increasing Accuracy of Crowdsourcing Tasks through Behavior Prediction and User Selection") CIKM'16, Oct. 24-28, 2016, Indianapolis, IN, USA (Year: 2016).*

(Continued)

*Primary Examiner* — Kakali Chaki
*Assistant Examiner* — Su-Ting Chuang
(74) *Attorney, Agent, or Firm* — Erik Johnson; Otterstedt & Kammer PLLC

(57) ABSTRACT

A model requester node, which is an edge node of a cloud computing network, generates a specification of a machine learning model, distributes the specification to a plurality of other edge nodes, and receives replies to the specification from the plurality of other edge nodes. In response to the replies, the model requester node identifies a set of participating edge nodes based on a learning utility and a cost estimate of each of the plurality of other edge nodes. The model requester node then trains the machine learning model, without exchanging training data among the model requester node and the participating edge nodes, by repeatedly: distributing most recent parameters of the machine learning model to the participating edge nodes; receiving updates to the most recent parameters from the participating edge nodes; and establishing new parameters for the machine learning model by aggregating the updates from the participating edge nodes.

18 Claims, 8 Drawing Sheets

(56) References Cited

U.S. PATENT DOCUMENTS

2019/0318268 A1  10/2019  Wang

OTHER PUBLICATIONS

Boutsis ("On task assignment for real-time reliable crowdsourcing") 2014 IEEE 34th International Conference on Distributed Computing Systems (Year: 2014).*
Peter Mell et al., "The NIST Definition of Cloud Computing". Special Publication 800-145. NIST. Sep. 2011, pp. 1-7.
John E. Kelly III, "Computing, cognition, and the future of knowing", IBM Corp. Oct. 2015. pp. 1-7.
Kevin Hsieh et al., "Gaia: Geo-Distributed Machine Learning Approaching LAN Speeds". Proceedings of the 12th USENIX Symposium on Networked Systems Design and Implementation. Mar. 2017. pp. 629-647.
Mu Li et al., "Scaling Distributed Machine Learning with the Parameter Server". Proceedings of the 11th USENIX Symposium on Operating Systems Design and Implementation. Oct. 2014. vol. 14, pp. 583-598.
H. Brendan Mcmahan et al., "Communication-Efficient Learning of Deep Networks from Decentralized Data". arXiv:1602.05629v3. Feb. 2017. pp. 1-11.
Ashish Vulimiri, et al., "Global Analytics in the Face of Bandwidth and Regulatory Constraints". Proceedings of the 10th USENIX Symposium on Networked Systems Design and Implementation. May 2015. vol. 7, No. 7.2, pp. 7-8.
Rhea Kelly, "Internet of Things data to top 1.6 zettabytes by 2020," Apr. 2015. [Online]. Available: https://campustechnology.com/articles/2015/04/15/internet-of-things-data-to-top-1-6-zettabytes-by-2020.aspx. pp. 1 -2.

* cited by examiner

COLLABORATIVE DISTRIBUTED MACHINE LEARNING

BACKGROUND

The present invention relates to machine learning, and more specifically, to distribution of machine learning across collaborative computing nodes.

Many emerging applications such as Internet of Things (IoT), social networking, and crowd-sourcing generate a large amount of data at the edge. It has been predicted that the amount of data will exhibit an exponential increase, while the annual growth of communication bandwidth has been decreasing in recent years. As a result, research organizations predict that over 90% of data will be stored and processed locally in the near future.

Machine learning is a common technique of utilizing large datasets to train models. The trained models can then be used in various applications. Distributed machine learning and federated learning enable model training without sending raw data to a central location.

Generally, machine learning can be implemented by a cognitive neural network. A cognitive neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A cognitive neural network can implement supervised, unsupervised, or semi-supervised machine learning. The cognitive neural network learns by modifying parameters of a model of a system that produces outputs from inputs. The model parameters include the output weights assigned to each of the neurons as well as (optionally) the threshold functions.

SUMMARY

Principles of the invention provide techniques for collaborative distributed machine learning. In one aspect, an exemplary computer-implemented method for distributed machine learning includes a model requester node, which is an edge node of a network of cloud computing nodes, generating a specification of a machine learning model, distributing the specification from the model requester node to a plurality of other edge nodes in the network, and receiving replies to the specification from the plurality of other edge nodes at the model requester node. In response to the replies, the model requester node identifies a set of participating edge nodes that indicate ability to match the specification. The model requester node then trains the machine learning model, without exchanging training data among the model requester node and the participating edge nodes, by repeatedly: distributing most recent parameters of the machine learning model to the participating edge nodes; receiving updates to the most recent parameters from the participating edge nodes; and establishing new parameters for the machine learning model by aggregating the updates from the participating edge nodes.

In another aspect, another exemplary computer-implemented method for distributed machine learning includes a model requester node, which is an edge node of a network of cloud computing nodes, generating seed parameters of a machine learning model by performing preliminary training of the machine learning model, then obtaining external updated parameters by facilitating one-step updates to the seed parameters by each of a plurality of other edge nodes and obtaining internal updated parameters by performing a one-step update of the seed parameters at the model requester node. The model requester node then aggregates the external and internal updated parameters at the model requester node, estimates learning utility of each of the plurality of other edge nodes (based on comparison of the external updated parameters to the internal updated parameters), requests cost estimates from each of the plurality of other edge nodes, and identifies a lowest-value edge node from the plurality of other edge nodes, based on a smallest value of a ratio of learning utility to cost estimate for each of the plurality of other edge nodes. The model requester node then reduces the plurality of other edge nodes by excluding the lowest-value edge node from the plurality of other edge nodes, and generates a set of participating edge nodes from the plurality of other edge nodes by repeating steps of identifying and reducing until a total of the cost estimates from the plurality of other edge nodes is within a cost budget of the model requester node. Using the set of participating edge nodes, the model requester node trains the machine learning model by repeatedly distributing most recent parameters of the machine learning model to the participating edge nodes, receiving updates to the most recent parameters from the participating edge nodes, and establishing new parameters for the machine learning model by aggregating the updates from the participating edge nodes.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a tangible computer readable storage medium (or multiple such media) and implemented on a hardware processor, or (iii) a combination of (i) and (ii); any of (i)-(iii) implement the specific techniques set forth herein.

In view of the foregoing, techniques of the present invention can provide substantial beneficial technical effects. For example, one or more embodiments provide one or more of:

Distributed machine learning with enhanced speed.

Distributed machine learning with decreased bandwidth consumption.

Distributed machine learning with resource-efficient selection of learning nodes.

Distributed machine learning with price negotiation among different learning nodes.

These and other features and advantages of the present invention will become apparent from the following detailed description of illustrative embodiments thereof, which is to be read in connection with the accompanying drawings.

DETAILED DESCRIPTION

Figure 1:
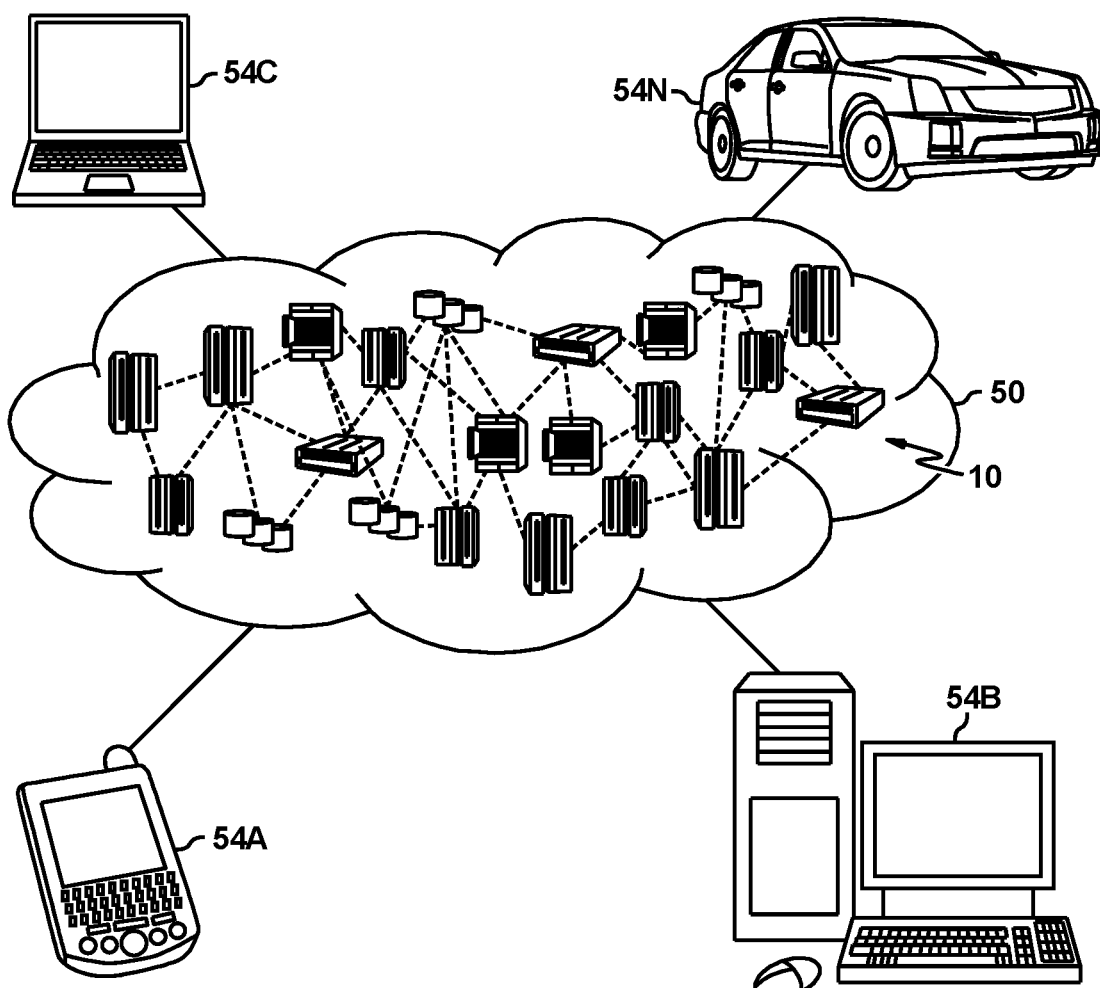
FIG. 1 depicts a cloud computing environment according to an embodiment of the present invention.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
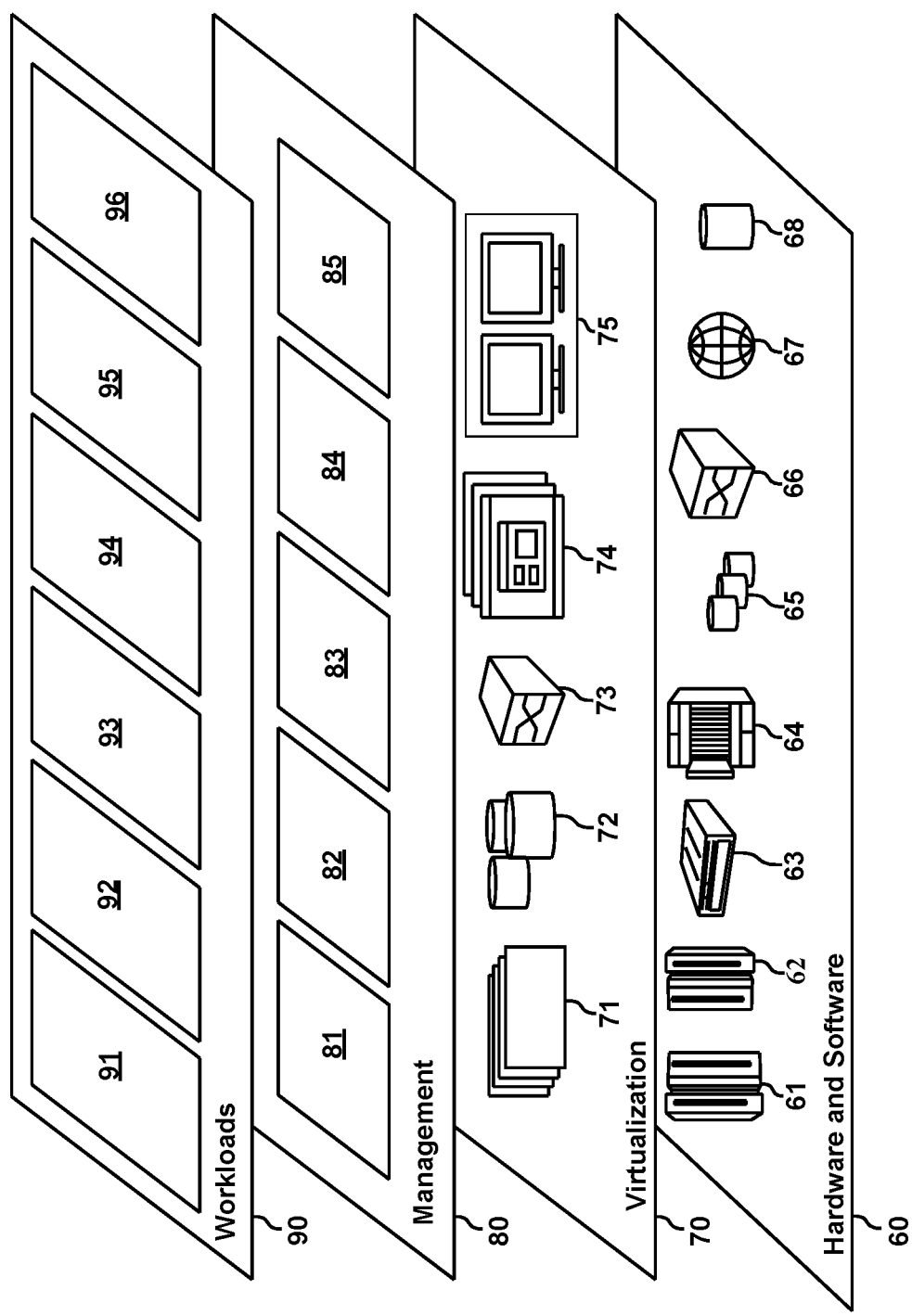
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and distributed machine learning 96. Indeed, some or all of the distributed machine learning components disclosed herein can reside in the cloud; in some embodiments, each component resides on a different server in the cloud.

Figure 3:
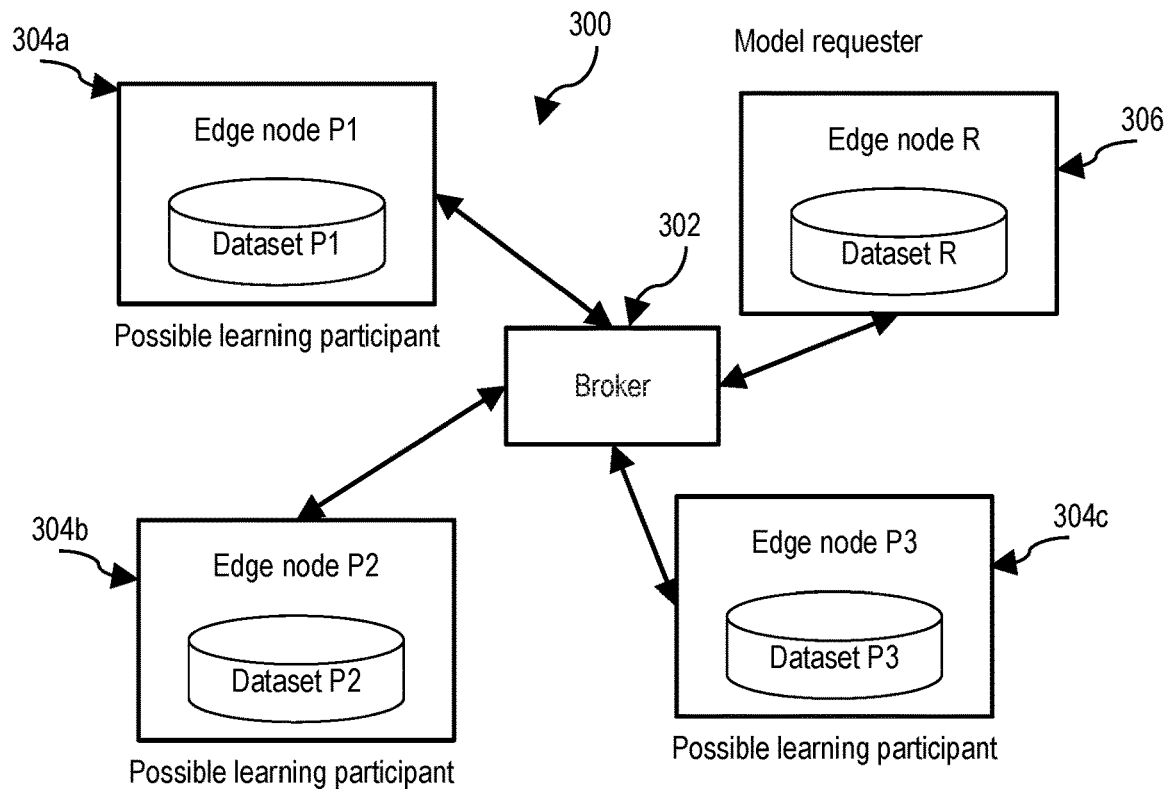
FIG. 3 depicts a brokered architecture for distributed machine learning, according to an exemplary embodiment.
Figure 4:
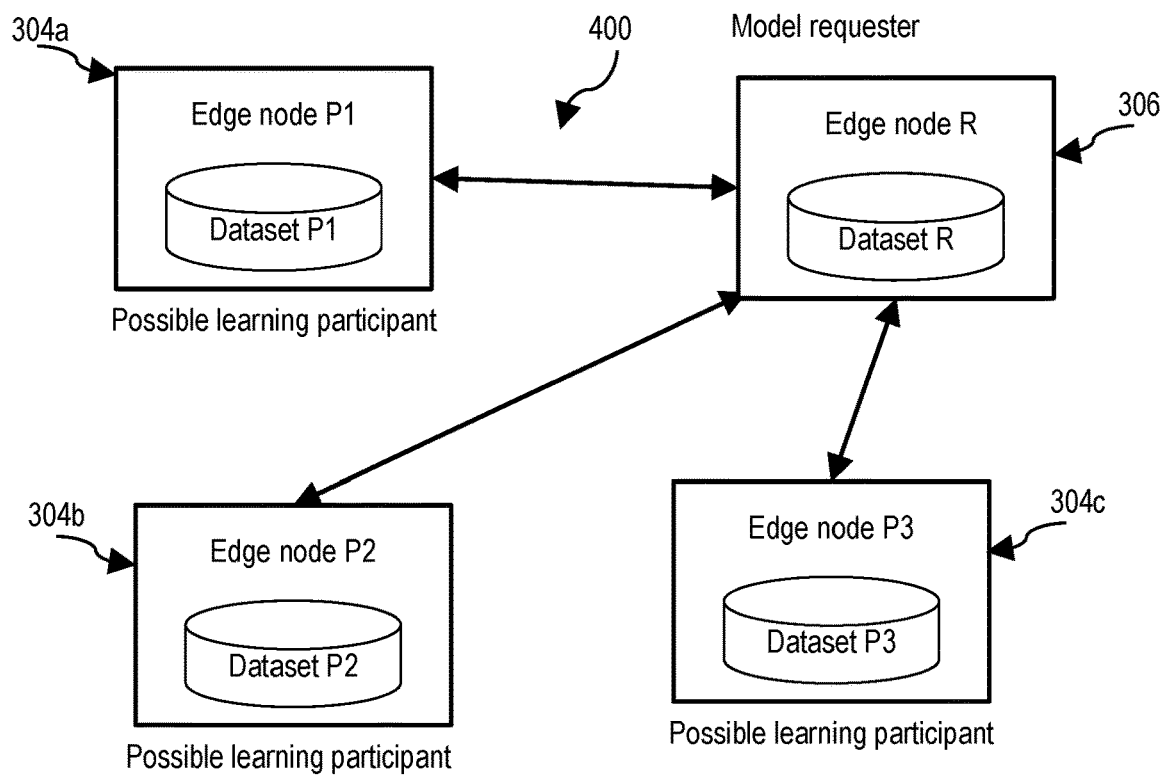
FIG. 4 depicts a peer-to-peer architecture for distributed machine learning, according to an exemplary embodiment.

In one or more embodiments, the distributed machine learning workload 96 is implemented in a plurality of cloud computing nodes 10. FIG. 3 depicts a brokered architecture 300 for the distributed machine learning workload 96. In the brokered architecture 300, a broker node 302 acts as a data hub that facilitates communication among a plurality of edge nodes 304a, 304b, 304c and a model requester node 306. FIG. 4 depicts a peer-to-peer architecture 400 for the distributed machine learning workload 96. In the peer-to-peer architecture 400, each edge node 304a, 304b, 304c is connected in direct communication with the model requester node 306. In one or more embodiments the edge nodes and the broker node are, for example, cloud computing nodes 10. Model requester 306 is discussed below.

Advantageously, one or more embodiments of the distributed machine learning workload 96 facilitate machine learning without exchanging bulky datasets between nodes. Additionally, one or more embodiments of the distributed machine learning workload 96 recruit only nodes that can contribute significantly toward updating model parameters (have high learning utilities). Accordingly, one or more embodiments of the distributed machine learning workload 96 accomplish model training without consuming large amounts of bandwidth. Furthermore, one or more embodiments of the distributed machine learning workload 96 recruit only low cost nodes.

Figure 5A:
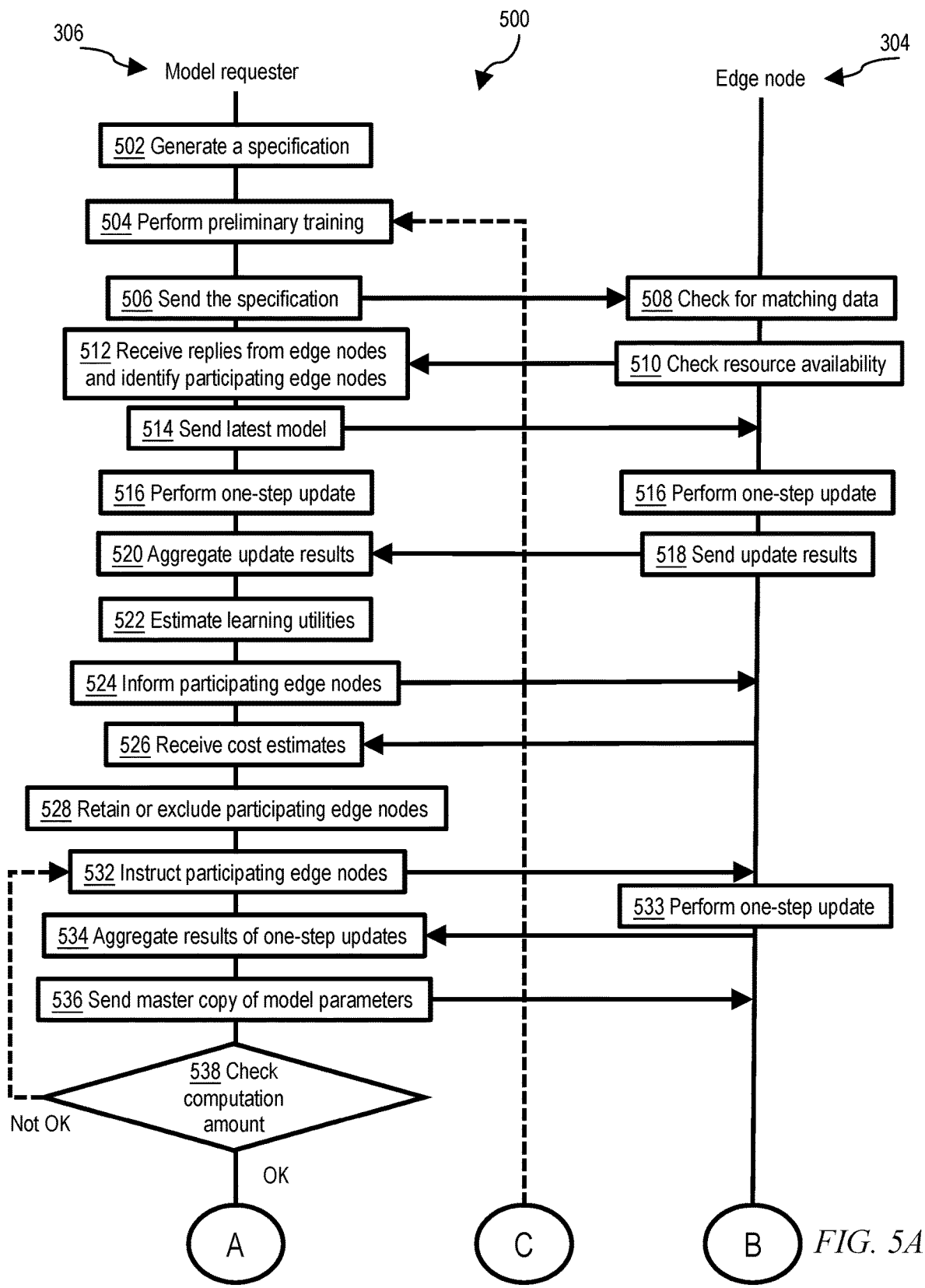
FIGS. 5A-5B depict a method for distributed machine learning, according to an exemplary embodiment.
Figure 5B:
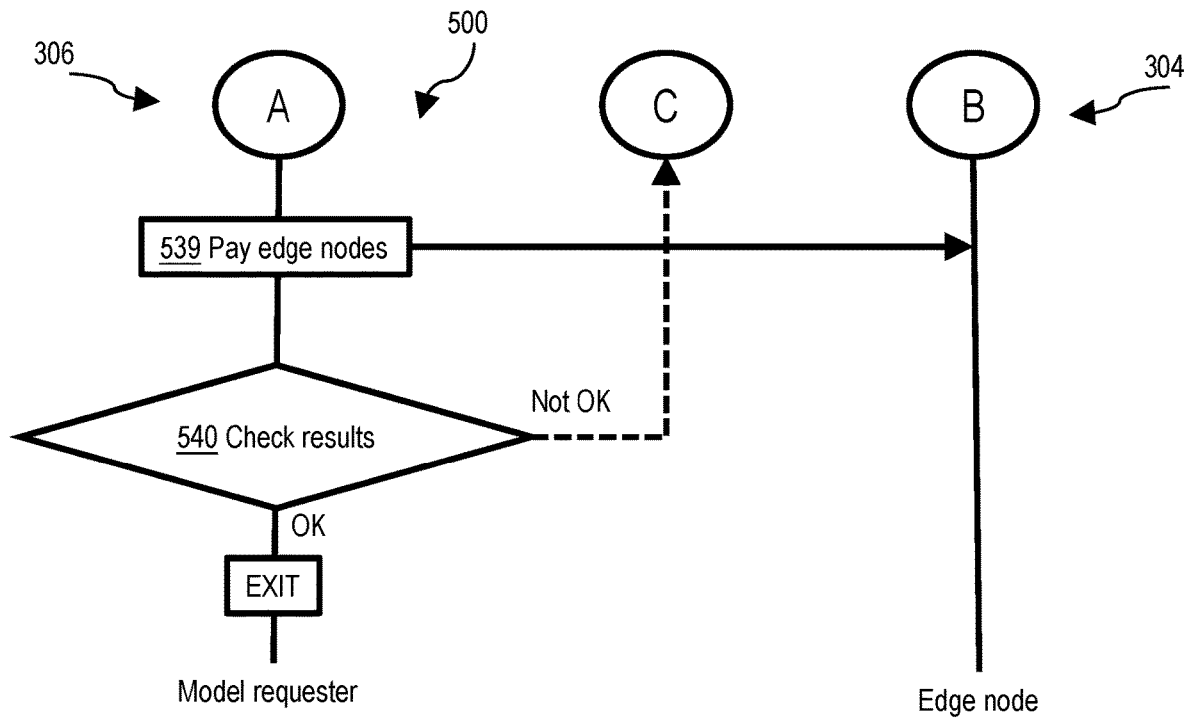

FIGS. 5A-5B depict a method 500 for distributed machine learning, according to an exemplary embodiment. At 502, a model requester 306 (shown in FIGS. 3 and 4) generates a specification (such as input data format, number of output classes, etc.) of a machine learning model for which the model requester wants to accomplish a machine learning task. At 504, the model requester 306 performs one or more steps of preliminary training of the machine learning model, using its own local dataset. Then, at 506 the model requester 306 sends the specification to other edge nodes 304 (generally, any desired number of edge nodes such as 304a, 304b, 304c . . . ). In a brokered architecture as shown in FIG. 3, the model requester 306 sends the specification via the broker 302; otherwise, the model requester sends the specification directly to the other edge nodes.

At 508, each edge node checks whether it possesses data that matches with the specification (e.g., if a node only has audio data, it cannot participate in a task for image classification), and at 510 each edge node checks whether it has enough computation and communication resources to run its part of a distributed learning task. At 512, the model requester receives replies from each of the edge nodes 304, based on the checking steps, regarding each edge node's ability to match the specification and to participate in the model requester's distributed learning task. Based on the replies, the model requester node 306 identifies the participating edge nodes.

At 514, the model requester node 306 sends the latest model (with a set of seed parameters that have been updated by the preliminary training at step 504) to all the participating edge nodes 304. In one or more embodiments, only the model is exchanged among the nodes, the local datasets at edge nodes are not exchanged. At 516, after receiving the latest model, each participating node (including the edge nodes 304 and the model requester node 306) performs a one-step update using the model and its own dataset. For example, in model training based on gradient descent, this one-step update can be the gradient evaluated on the local dataset. At 518, each participating edge node sends the one-step update result to the model requester. At 520, the model requester node 306 collects and aggregates the one-step update results of all nodes, including results produced by updating the seed parameters at the model requester node based on training data available at that node.

At 522, the model requester estimates (based on the one-step update results) the divergence of datasets at different nodes, and the usefulness of each participating edge node to the overall learning task (learning utility). Step 522 is further described below with reference to method 700 shown in FIG. 7.

At 524, the model requester node 306 informs each participating edge node 304 of its learning utility and of an amount of computation to be performed (specified as a number of local training iterations or as an amount of physical time). Then, at 526 the model requester node 306 receives from each participating edge node 304 an estimated cost of performing the distributed learning task, i.e. a requested price to be paid by the model requester. The information (price) shared among different edge nodes is in the form of a currency (either dollar amount or digital currency). The price is derived from the availability of CPU time, storage, etc. on each edge node independently.

Figure 8:
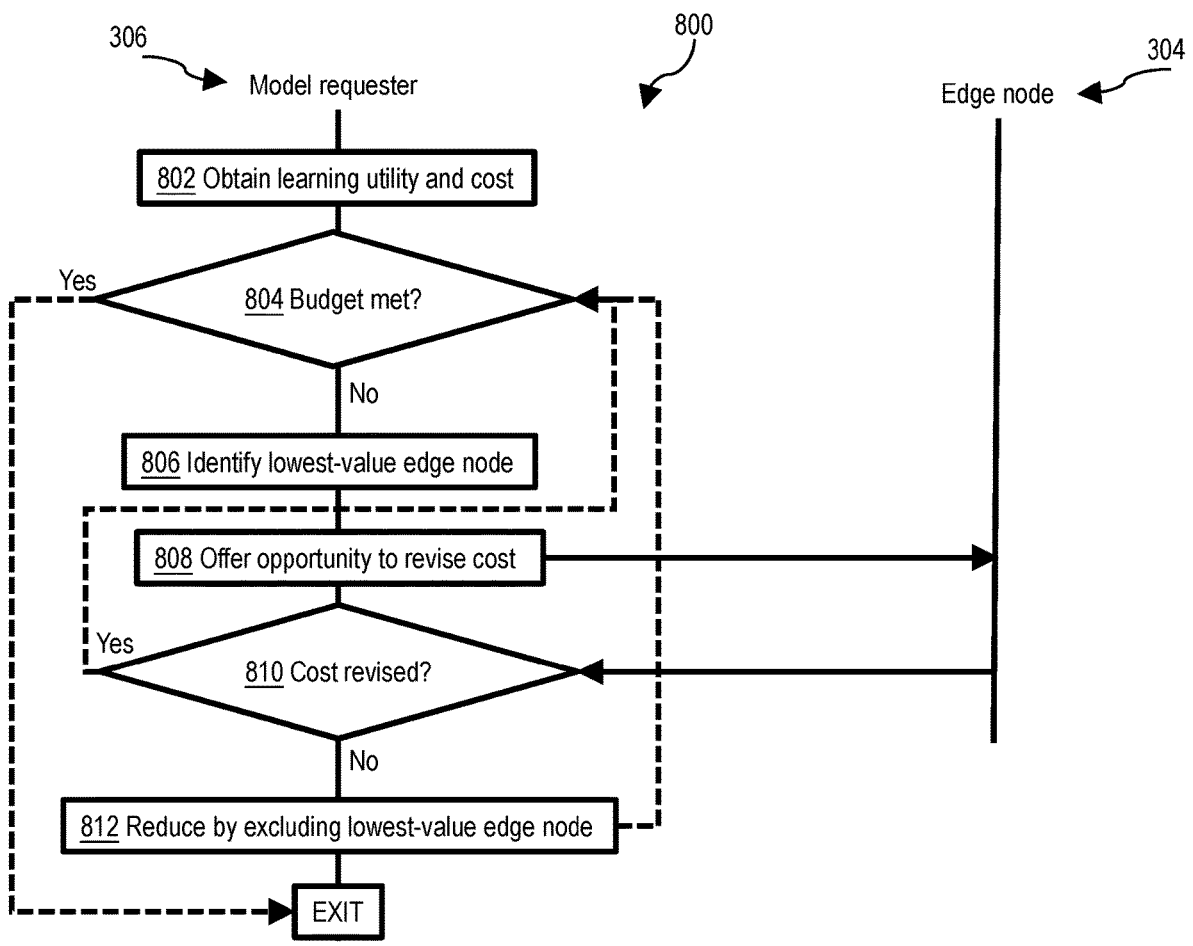
FIG. 8 depicts a resource-efficient method for selecting edge nodes to participate in the method of FIGS. 5A-5B, according to an exemplary embodiment.

In one or more embodiments, at 528 the model requester node 306 determines for each participating edge node 304 (based on a total budget and on a learning utility of the particular node) whether to retain the node at the asked price, negotiate for another price, or exclude the node from this round of model training. A round of model training is defined as one sequence of steps 532-536. In further detail, at 528 the model requester 306 refines the set of participating edge nodes to participate in the distributed machine learning task of training the machine learning model, as further explained with reference to FIG. 8. The model requester 306 retains some of the participating edge nodes, and excludes others of the participating edge nodes, based at least in part on a value of each participating edge node as measured by a ratio of learning utility to estimated cost. FIG. 8 depicts a method 800 for implementing step 528.

In one or more embodiments, if the model requester decides to negotiate the price, the negotiation takes multiple iterations until a final retain or exclude decision is reached. Thus, the decision of whether to retain or exclude a participating edge node is made by the model requester based on the asked price, the learning utility of the edge node, and (in one or more embodiments) a measure based on historical observations of truthfulness of the training data available at that node, as further explained below with reference to FIG. 8.

At 532, the model requester 306 instructs each edge node 304 that has been retained to perform a one-step update of its local copy of the model parameters, based on its local dataset. At 533, each retained edge node performs a one-step update. At 534, the model requester 306 collates and aggregates the updated model parameters from each retained edge node 304, which collates the updated model parameters of all the edge nodes to produce a new master copy of the model parameters. At 536, the model requester 306 sends the master copy of the model parameters to each of the retained edge nodes 304, and each edge node makes a new local copy of the model parameters. At 538, the method 500 then checks whether it has reached the computation amount specified in step 524. If not, then the method 500 cycles to step 532. If so, then at 539, the model requester 306 pays each of the edge nodes 304 its associated cost. At 540 the method 500 checks whether the model parameters produce acceptable results on a test dataset. If not, then the method 500 cycles to step 504. If so, then the method 500 exits.

Figure 6:
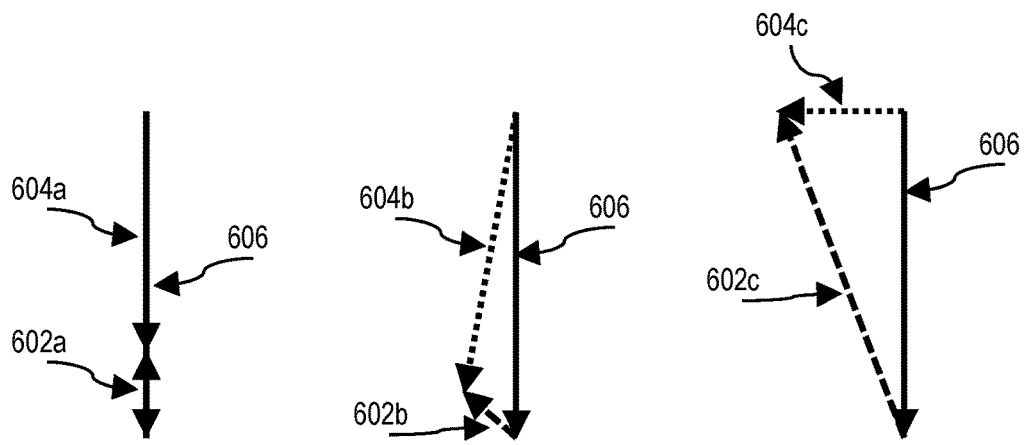
FIG. 6 depicts differing learning utilities of several edge nodes of a distributed learning system compared to a model requester, according to an exemplary embodiment.

FIG. 6 depicts differing learning utilities 602a, 602b, 602c of several edge nodes 304 of a distributed learning system compared to the model requester 306 (which can be one of the edge nodes 304 as shown in FIGS. 3 and 4). Each vector 604a, 604b, 604c indicates a change in model parameters provided by a corresponding edge node 304a, 304b, 304c (as shown in FIGS. 3 and 4) performing a one-step model update based on its local dataset. Vector 606 indicates a change in model parameters provided by the model requester 306 performing a one-step model update based on its local dataset. Each vector 602a, 602b, 602c indicates a learning utility of the corresponding edge node 304, which is a difference between the change in model parameters provided by the edge node and the change in model parameters provided by the model requester 306. Vector 604a, which is the change in model parameters provided by edge node 304a, is in the same direction as vector 606, so edge node 304a provides no learning utility. Vector 604b, which is the change in model parameters provided by edge node 304b, has a slightly different direction from vector 606, so edge node 304b provides some (but low) learning utility. Vector 604c has a significantly different direction from vector 606, which indicates a large difference and therefore a large learning utility (adding the corresponding edge node 304c significantly impacts on the updated model parameters).

Figure 7:
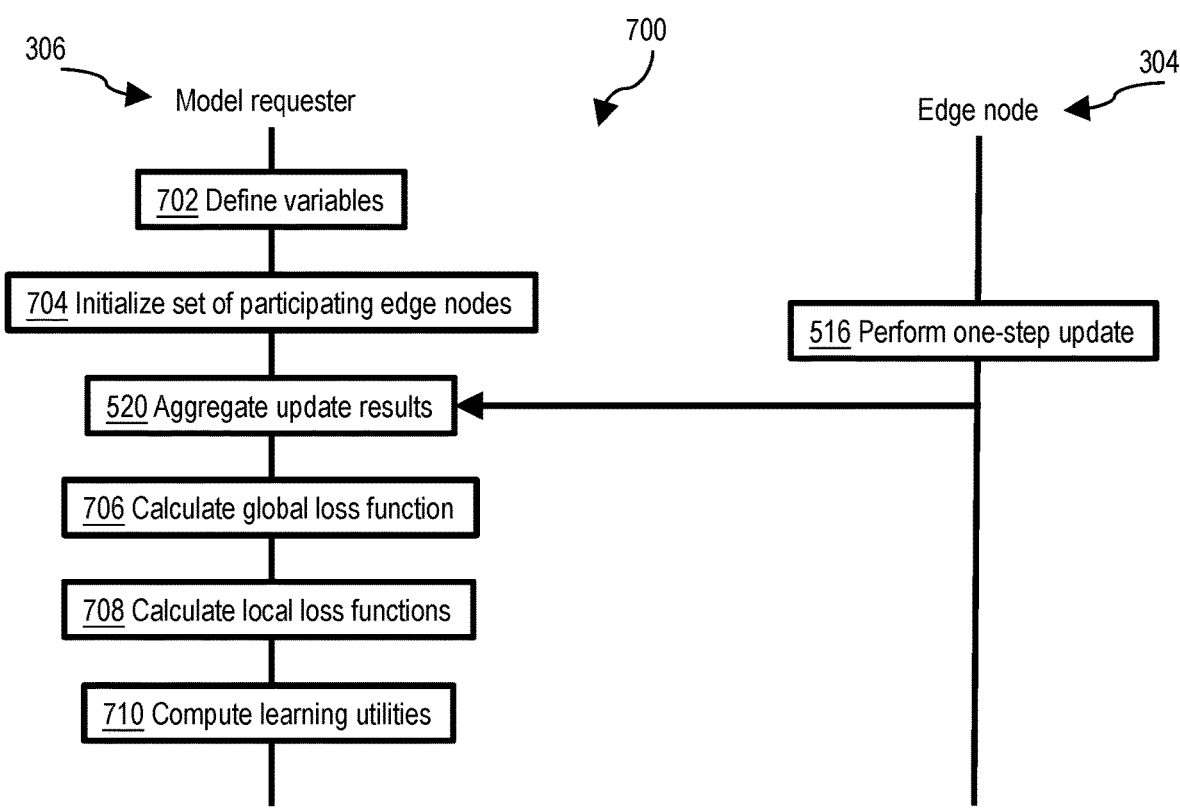
FIG. 7 depicts a method for determining learning utility of an edge node, according to an exemplary embodiment.

FIG. 7 depicts a method 700 for the model requester 306 determining learning utility of the participating edge nodes 304, according to step 522 of method 500.

At 702, define variables: w the vector of model parameters, F(w) a global loss function, Fi(w) a local loss function for each participating edge node i, $D_i$ a dataset size at each participating edge node, and D the sum of dataset sizes at all participating edge nodes.

At 704, initialize a set $\mathcal{N}$ of all participating edge nodes. At 516, each participating edge node 304 performs a one-step model update. At 520, aggregate the results (suggested model parameter changes) of all the one-step model updates. At 706, calculate the global loss function, w(t)−w(t−1)=−μ∇F(w(t−1)). At 708, calculate the local loss function for each participating edge node i, $$\nabla F(w(t-1)) = \frac{1}{D}\Sigma_{i \in \mathcal{N}} D_i \nabla F_i(w(t-1)).$$

At 710, compute the learning utility $u(i_0)$ of each edge node $i_0$:

$$u(i_0) = \min_{\{D_i'\}} \left\| \frac{1}{D} \Sigma_i D_i \nabla F_i(w(t-1)) - \frac{1}{D'} \Sigma_{i} D_i' \nabla F_i(w(t-1)) \right\|$$

FIG. 8 depicts a resource-efficient method 800 for retaining edge nodes from the set $\mathcal{N}$ of participating edge nodes to continue participating in the method of FIGS. 5A-5B, according to step 528 of method 500. At 802, obtain a learning utility u, according to method 700, and obtain a cost c associated with each participating edge node $i_0$. At 804, check whether a total cost C is within a budgeted amount. If so, exit, and continue to step 532 of method 500. If not, continue to 806. At 806, identify a lowest-value edge node $i_0^*$ based on $$i_0^* = \operatorname{argmin}_{i_0} u(i_0)/c_{i_0}.$$

At 808, offer the lowest value edge node $i_0^*$ an opportunity to revise its cost. At 810, check whether the lowest value edge node $i_0^*$ revises its cost. If the lowest value edge node does revise its cost, repeat step 804 (checking the budget). If the lowest value edge node does not revise its cost, then at 812 reduce the set of participating edge nodes by excluding the lowest value edge node $i_0^*$ from the set $\mathcal{N}$. Then return to 804. Once the budget is met at 804, then exit, retaining the set of participating edge nodes that provide adequate learning utility within the total budgeted cost.

Alternatively, instead of simply identifying the lowest value edge node, one can identify an edge node that has the lowest combination of value and truthfulness. The truthfulness can be determined by randomly or sporadically excluding from the set of participating edge nodes at least one edge node with high learning utility (e.g., learning utility greater than the median learning utility of all the participating edge nodes), then comparing the training accuracy with and without these nodes over time, to determine the truthfulness of suspicious edge nodes. This is because, if a node's learning utility is very high, it means that this node has training data that is very different from other nodes, so the system may want to inspect whether the data at this node is helpful or harmful for training the model. The learning utility is defined as shown with reference to step 710 in FIG. 7.

Given the discussion thus far, it will be appreciated that, in general terms, an exemplary computer-implemented method for distributed machine learning, according to an aspect of the invention, includes generating a specification of a machine learning model at a model requester node that is an edge node of a network of cloud computing nodes, distributing the specification from the model requester node to a plurality of other edge nodes in the network, and receiving replies to the specification from the plurality of other edge nodes at the model requester node. In response to the replies, the model requester node identifies a set of participating edge nodes that indicate ability to match the specification. The model requester node then trains the machine learning model, without exchanging training data among the model requester node and the participating edge nodes, by repeatedly: distributing most recent parameters of the machine learning model to the participating edge nodes; receiving updates to the most recent parameters from the participating edge nodes; and establishing new parameters for the machine learning model by aggregating the updates from the participating edge nodes.

In one or more embodiments, the specification includes at least one of input data format and number of output classes.

In one or more embodiments, the specification, the replies, and the parameters of the machine learning model are communicated via a broker node distinct from the model requester node and the other edge nodes.

In one or more embodiments, the broker node is at a server of the cloud computing network.

In one or more embodiments, training the machine learning model further includes generating results at the model requester node by updating the most recent parameters based on training data available at the model requester node, and aggregating the updates includes combining the results from the model requester node with the updates from the participating edge nodes.

In one or more embodiments, each of the participating edge nodes updates the model parameters based only on training data available at that participating edge node.

In one or more embodiments, identifying a set of participating edge nodes includes the model requester node generating seed parameters of the machine learning model by performing preliminary training of the machine learning model, then obtaining external updated parameters by facilitating one-step updates to the seed parameters by each of the plurality of other edge nodes and obtaining internal updated parameters by performing a one-step update of the seed parameters at the model requester node. The model requester node then aggregates the external and internal updated parameters at the model requester node, and estimates learning utility of each of the plurality of other edge nodes, based on comparison of the external updated parameters to the internal updated parameters. Furthermore, the model requester node requests cost estimates from each of the plurality of other edge nodes, and identifies a lowest-value edge node from the plurality of other edge nodes, based on a smallest value of a ratio of learning utility to cost estimate for each of the plurality of other edge nodes. The model requester node reduces the plurality of other edge nodes by excluding the lowest-value edge node from the plurality of other edge nodes, and generates the set of participating edge nodes from the plurality of other edge nodes by repeating steps of identifying and reducing until a total of the cost estimates from the plurality of other edge nodes is within a cost budget of the model requester node.

Another exemplary computer-implemented method for distributed machine learning includes a model requester node, which is an edge node of a network of cloud computing nodes, generating seed parameters of a machine learning model by performing preliminary training of the machine learning model, then obtaining external updated parameters by facilitating one-step updates to the seed parameters by each of a plurality of other edge nodes and obtaining internal updated parameters by performing a one-step update of the seed parameters at the model requester node. The model requester node then aggregates the external and internal updated parameters at the model requester node, estimates learning utility of each of the plurality of other edge nodes, based on comparison of the external updated parameters to the internal updated parameters, requests cost estimates from each of the plurality of other edge nodes, and identifies a lowest-value edge node from the plurality of other edge nodes, based on a smallest value of a ratio of learning utility to cost estimate for each of the plurality of other edge nodes. The model requester node then reduces the plurality of other edge nodes by excluding the lowest-value edge node from the plurality of other edge nodes, and generates a set of participating edge nodes from the plurality of other edge nodes by repeating steps of identifying and reducing until a total of the cost estimates from the plurality of other edge nodes is within a cost budget of the model requester node. Using the set of participating edge nodes, the model requester node trains the machine learning model by repeatedly distributing most recent parameters of the machine learning model to the participating edge nodes, receiving updates to the most recent parameters from the participating edge nodes, and establishing new parameters for the machine learning model by aggregating the updates from the participating edge nodes.

In one or more embodiments, the seed parameters and the external parameters of the machine learning model are communicated via a broker node distinct from the model requester node and the other edge nodes.

In one or more embodiments, the broker node is at a server of the cloud computing network.

In one or more embodiments, training the machine learning model further includes generating results at the model requester node by updating the most recent parameters based on training data available at the model requester node, and aggregating the updates includes combining the results from the model requester node with the updates from the participating edge nodes.

In one or more embodiments, each of the participating edge nodes updates the model parameters based only on training data available at that participating edge node.

In one or more embodiments, identifying the lowest-value edge node incorporates a measure of truthfulness determined by excluding from the participating edge nodes at least one edge node with relatively high learning utility, then comparing the training accuracy with and without the at least one edge node over time.

Figure 9:
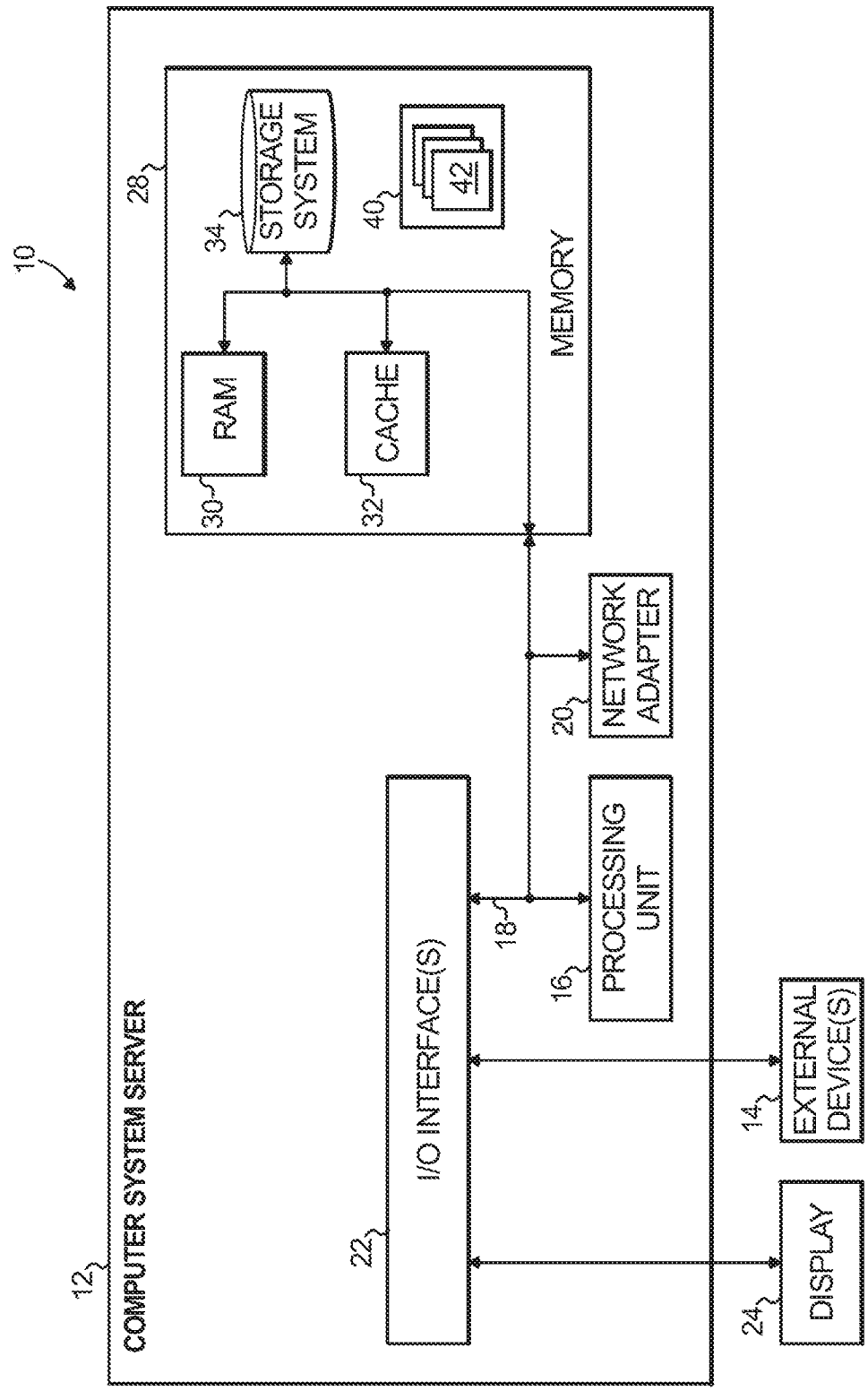
FIG. 9 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions that when executed by a computer cause the computer to perform exemplary method steps. FIG. 9 depicts a computer system that may be useful in implementing one or more aspects and/or elements of the invention, also representative of a cloud computing node according to an embodiment of the present invention. Referring now to FIG. 9, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 9, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 9) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, a module for implementing the model requester node, a module for implementing each of the other edge nodes, and/or a module for implementing the broker node. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for distributed machine learning comprising:
    generating a specification of a machine learning model at a model requester node that is an edge node of a network of cloud computing nodes;
    distributing the specification from the model requester node to a plurality of other edge nodes in the network;
    receiving replies to the specification from the plurality of other edge nodes at the model requester node, wherein the replies for each of the other edge nodes include a learning utility and an estimated cost of performing a distributed learning task;
    in response to the replies, the model requester node identifying a set of participating edge nodes that indicate ability to match the specification, wherein identifying the set of participating edge nodes includes an iterative process of identifying a lowest-value edge node, negotiating a revised cost with the lowest-value edge node, and excluding the lowest-value edge node when the lowest-value edge node refuses to revise its cost; and
    training the machine learning model, without exchanging training data among the model requester node and the participating edge nodes, by repeatedly:
        distributing most recent parameters of the machine learning model to the participating edge nodes;
        receiving updates to the most recent parameters from the participating edge nodes; and
        establishing new parameters for the machine learning model by aggregating the updates from the participating edge nodes.

2. The method of claim 1 wherein the specification includes at least one of input data format and number of output classes.

3. The method of claim 1 wherein the specification, the replies, and the parameters of the machine learning model are communicated via a broker node distinct from the model requester node and the other edge nodes.

4. The method of claim 3 wherein the broker node is at a server of the cloud computing network.

5. The method of claim 1 wherein training the machine learning model further includes generating results at the model requester node by updating the most recent parameters based on training data available at the model requester node, and aggregating the updates includes combining the results from the model requester node with the updates from the participating edge nodes.

6. The method of claim 1 wherein each of the participating edge nodes updates the model parameters based only on training data available at that participating edge node.

7. A computer-implemented method for distributed machine learning comprising:
   generating seed parameters of a machine learning model by performing preliminary training of the machine learning model at a model requester node that is an edge node of a network of cloud computing nodes;
   obtaining external updated parameters by facilitating one-step updates to the seed parameters by each of a plurality of other edge nodes;
   obtaining internal updated parameters by performing a one-step update of the seed parameters at the model requester node;
   aggregating the external and internal updated parameters at the model requester node;
   estimating learning utility of each of the plurality of other edge nodes, based on comparison of the external updated parameters to the internal updated parameters;
   requesting, from each of the plurality of other edge nodes, an estimated cost of performing a distributed learning task;
   identifying a lowest-value edge node from the plurality of other edge nodes, based on a smallest value of a ratio of learning utility to cost estimate for each of the plurality of other edge nodes;
   negotiating at least one cost revision with the lowest-value edge node;
   reducing the plurality of other edge nodes by excluding the lowest-value edge node from the plurality of other edge nodes when the lowest-value edge node refuses to revise its cost;
   generating a set of participating edge nodes from the plurality of other edge nodes by repeating steps of identifying and reducing until a total of the cost estimates from the plurality of other edge nodes is within a cost budget of the model requester node; and
   training the machine learning model by repeatedly:
      distributing most recent parameters of the machine learning model to the participating edge nodes;
      receiving updates to the most recent parameters from the participating edge nodes; and
      establishing new parameters for the machine learning model by aggregating the updates from the participating edge nodes.

8. The method of claim 7 wherein the seed parameters and the external parameters of the machine learning model are communicated via a broker node distinct from the model requester node and the other edge nodes.

9. The method of claim 8 wherein the broker node is at a server of the cloud computing network.

10. The method of claim 7 wherein training the machine learning model further includes generating results at the model requester node by updating the most recent parameters based on training data available at the model requester node, and aggregating the updates includes combining the results from the model requester node with the updates from the participating edge nodes.

11. The method of claim 7 wherein each of the participating edge nodes updates the model parameters based only on training data available at that participating edge node.

12. The method of claim 7 wherein identifying the lowest-value edge node incorporates a measure of truthfulness determined by excluding from the participating edge nodes at least one edge node with relatively high learning utility, then comparing the training accuracy with and without the at least one edge node over time.

13. A non-transitory computer readable medium embodying computer executable instructions that when executed by a computer cause the computer to facilitate a method of:
   generating a specification of a machine learning model at a model requester node that is an edge node of a network of cloud computing nodes;
   distributing the specification from the model requester node to a plurality of other edge nodes in the network;
   receiving replies to the specification from the plurality of other edge nodes at the model requester node, wherein the replies for each of the other edge nodes include a learning utility and an estimated cost of performing a distributed learning task;
   in response to the replies, the model requester node identifying a set of participating edge nodes that indicate ability to match the specification, wherein identifying the set of participating edge nodes includes an iterative process of identifying a lowest-value edge node, negotiating a revised cost with the lowest-value edge node, and excluding the lowest-value edge node when the lowest-value edge node refuses to revise its cost; and
   training the machine learning model, without exchanging training data among the model requester node and the participating edge nodes, by repeatedly:
      distributing most recent parameters of the machine learning model to the participating edge nodes;
      receiving updates to the most recent parameters from the participating edge nodes; and
      establishing new parameters for the machine learning model by aggregating the updates from the participating edge nodes.

14. The computer readable medium of claim 13 wherein the specification includes at least one of input data format and number of output classes.

15. The computer readable medium of claim 13 wherein the specification, the replies, and the parameters of the machine learning model are communicated via a broker node distinct from the model requester node and the other edge nodes.

16. The computer readable medium of claim 15 wherein the broker node is at a server of the cloud computing network.

17. The computer readable medium of claim 13 wherein training the machine learning model further includes generating results at the model requester node by updating the most recent parameters based on training data available at the model requester node, and aggregating the updates includes combining the results from the model requester node with the updates from the participating edge nodes.

18. The computer readable medium of claim 13 wherein each of the participating edge nodes updates the model parameters based only on training data available at that participating edge node.

\* \* \* \* \*